Patented June 12, 1951

2,556,897

UNITED STATES PATENT OFFICE 2,556,897

PROCESSES FOR PREPARATION OF METHYL SILOXANES

Auguste Florentin Bidaud, Serezin-du-Rhone, France, assignor to Societe des Usines Chimiques Rhone-Poulenc, Paris, France, a French body corporate No Drawing. Application September 16, 1947, Serial No. 774,416. In France April 16, 1947

2 Claims. (Cl. 260—448.2)

This invention relates to the production of methyl siloxanes from methyl halogeno-silanes.

It is known that siloxanes can be produced by the condensation of silicols which are obtainable by the hydrolysis of halogeno-silanes. In all of the processes heretofore known the hydrolysis step involves the conversion of the halogen of the halogeno-silane into hydrogen halide which dissolves in the reaction mixture or is partially or completely liberated.

The hydrolysis reaction is extremely violent and it has been proposed to control and moderate the same by causing it to be brought about in two successive stages. In the first step, the halogen atoms of the halogeno-silane are converted into alkoxy groups by reacting the halogeno-silane with the theoretical quantity of alcohol required according to the equation:

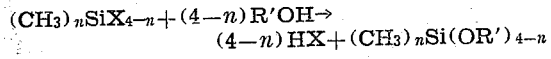

wherein X represents a halogen atom, $n$ is a whole number not greater than 3, and R' represents a member of the class consisting of alkyl and aralkyl groups. The resultant methoxy silane is then hydrolysed to silicol by means of an excess of water.

It is the principal object of the present invention to provide a more simple and advantageous process of producing methyl siloxanes from methyl halogeno-silanes and the process of this invention is based upon the observation that the reaction between a methyl halogeno-silane and methyl alcohol can be so controlled that the halogen of the halogeno-silane is eliminated, not in the form of hydrogen halide, but in the form of a methyl halide.

The object of this invention is achieved by the process which comprises maintaining a methyl halogeno-silane in reaction with a quantity of substantially anhydrous methyl alcohol at least twice the stoichiometric quantity required to form methyl halide using all the halogen atoms in the silane, at a temperature between 40° and 60° C. until evolution of methyl halide is at least substantially completed, and thereafter separating methyl siloxane from the reaction mixture.

The halogeno-silane employed may be of the general formula

where $n$ has the significance hereinbefore defined and X represents a halogen atom such as chlorine or bromine. As will be obvious, a mixture of one or more methyl halogeno-silanes may be employed, i. e. methyl trichloro silane, dimethyl dichloro silane and trimethyl chloro silane.

The methyl alcohol may be employed in the anhydrous state or may contain a small quantity of water negligible as compared with that quantity theoretically required for the hydrolysis.

As already stated, the quantity of alcohol employed must be at least twice, and preferably at least twice to four times, the stoichiometric quantity. In actual practice, satisfactory results can be obtained by running the halogeno-silane into a large quantity of methyl alcohol.

In order to obtain a sufficient velocity, the reaction is conducted at elevated temperature, preferably between 40° C. and the boiling point of 60° C. In this temperature range substantial liberation of hydrogen halide is avoided. As will be evident, the reaction temperature may be varied according to the specific reactants. Likewise, the reaction may be carried out under pressure in which case the temperature may be slightly increased. At normal pressure a temperature in the neighbourhood of the boiling point of the reaction mixture is in general satisfactory.

For best results from the viewpoint of yield, it is desirable to effect isolation of siloxane only after formation of methyl halide is substantially or entirely completed.

Since the organic substituent of the halogeno-silane and that of the alcohol are identical, i. e., they are both methyl groups, the methyl halide formed may be used as one of the starting materials for the production of the methyl halogeno-silane, a point of definite technical interest. Thus, for example, by reacting a methyl chloro silane with methyl alcohol there is liberated methyl chloride which may be recovered and used in the preparation of methyl chloro silane.

The process of the present invention is illustrated by the following, non-limitative example:

Example 516 parts of dimethyl-dichlorsilane are added gradually to 2000 parts of methanol, whereafter the mixture is heated to about 50° to 60° C. in an apparatus provided with a delivery tube leading to a condenser. After 5 hours, almost half the theoretical quantity of methyl chloride has been liberated. The mixture is kept hot until the theoretical quantity of methyl chloride has been evolved. The greater part of the excess alcohol is then separated by distillation. There remain two layers, the lower of which is constituted by siloxane (260 parts, or 88% of the theoretical yield) in the form of a viscous oil suitable for technical uses.

A similar yield is obtained if instead of partially distilling the excess of alcohol, the reaction mixture is treated with a large excess of water and the siloxane separated by decantation.

I claim:

1. A process for the preparation of methylsiloxanes which comprises maintaining a methyl halosilane, having the formula $(CH_3)_nSiX_{4-n}$ wherein X represents a halogen atom and $n$ is a whole number not greater than 3, in reaction with a quantity of substantially anhydrous methyl alcohol at least twice the stoichiometric quantity required to form methyl halide using all the halogen atoms in the silane, at a temperature of about 40° to 60° C. until evolution of methyl halide is at least substantially completed, and thereafter separating methyl siloxane from the reaction mixture.

2. A process for the preparation of methyl siloxanes which comprises gradually adding a methyl chlorosilane, having the formula $$(CH_3)_nSiX_{4-n}$$

wherein X represents a halogen atom and $n$ is a whole number not greater than 3, to a quantity of substantially anhydrous methyl alcohol at least twice the stoichiometric quantity required to form methyl chloride using all the halogen atoms in the silane, heating the reaction mixture at a temperature of about 40° to 60° C. until evolution of methyl chloride is at least substantially completed and thereafter separating methylsiloxane from said reaction mixture.

AUGUSTE FLORENTIN BIDAUD.

REFERENCES CITED

The following references are of record in the file of this patent:

UNITED STATES PATENTS

| Number | Name | Date |
| --- | --- | --- |
| 2,383,827 | Sprung | Aug. 28, 1945 |
| 2,398,672 | Sauer | Apr. 16, 1946 |
| 2,413,582 | Rust | Dec. 31, 1946 |
| 2,438,520 | Robie | Mar. 30, 1948 |

FOREIGN PATENTS

| Number | Country | Date |
| --- | --- | --- |
| 574,003 | Great Britain | Dec. 17, 1945 |

OTHER REFERENCES

Sauer: Journ. Amer. Chem. Soc., vol. 68, January 1946, pages 138 and 139.